United States Patent [19]

Masaki et al.

[11] Patent Number: 4,651,290
[45] Date of Patent: Mar. 17, 1987

[54] ROAD CONDITION DISCRIMINATING SYSTEM

[75] Inventors: Syouichi Masaki, Anjo; Noriyuki Nakashima, Nagoya, both of Japan

[73] Assignee: Nippondenso Co., Ltd., Kariya, Japan

[21] Appl. No.: 619,211

[22] Filed: Jun. 11, 1984

[30] Foreign Application Priority Data

Jun. 16, 1983 [JP] Japan ................. 58-108258

[51] Int. Cl.⁴ .............. G06F 15/14; G01B 5/28; B60G 11/26
[52] U.S. Cl. ................. 364/550; 364/424; 364/566; 73/105; 280/707; 280/6 H; 180/143
[58] Field of Search ............ 364/424, 426, 565, 566, 364/508; 246/182 R, 182 A, 182 B; 104/300; 180/197, 143; 280/6 H, 704, 707; 346/18, 33 D; 73/105

[56] References Cited

U.S. PATENT DOCUMENTS

| | | | |
|---|---|---|---|
| 4,126,036 | 11/1978 | Nilan et al. ....................... | 73/105 |
| 4,138,723 | 3/1979 | Nehmer et al. ................. | 364/426 X |
| 4,357,594 | 11/1982 | Ehrlich et al. .................. | 364/426 X |
| 4,401,310 | 8/1983 | Ishikawa et al. ............... | 280/707 X |
| 4,408,290 | 10/1983 | Kubo et al. ...................... | 364/566 |
| 4,422,322 | 12/1983 | Spangler ........................ | 73/105 |
| 4,435,768 | 3/1984 | Arikawa ............................ | 364/426 |
| 4,468,050 | 8/1984 | Woods et al. .................... | 280/707 |
| 4,476,529 | 10/1984 | Nakamura et al. ................ | 364/424 |
| 4,497,025 | 1/1985 | Hannoyer ......................... | 364/426 X |
| 4,517,647 | 5/1985 | Harada et al. .................... | 364/426 |
| 4,530,056 | 7/1985 | MacKinnon et al. ............... | 364/424 |
| 4,530,059 | 7/1985 | Brearley et al. .................. | 364/426 |
| 4,530,414 | 7/1985 | Fukino et al. .................... | 180/143 |
| 4,573,131 | 2/1986 | Corbin ............................. | 364/566 X |
| 4,586,138 | 4/1986 | Mallenhoff et al. ................ | 364/424 |
| 4,586,728 | 5/1986 | Tokunaga et al. ................. | 280/707 |
| 4,595,072 | 6/1986 | Barnea ............................ | 280/707 X |
| 4,600,215 | 7/1986 | Kuroki et al. .................... | 280/707 |
| 4,602,695 | 7/1986 | Takeshima ....................... | 180/143 |

FOREIGN PATENT DOCUMENTS

57-77946 5/1982 Japan .
58-5900 1/1983 Japan .

*Primary Examiner*—Errol A. Krass
*Assistant Examiner*—Joseph L. Dixon
*Attorney, Agent, or Firm*—Cushman, Darby & Cushman

[57] ABSTRACT

A road surface condition discriminating system is disclosed, in which a vehicle speed signal produced from a vehicle speed sensor mounted on a part of the wheel system of an automobile running on a road is analyzed to decide the road surface conditions on the basis of the variations in the wheel revolutions. The system computes the acceleration from the derivative of the measured speed and then various actuating devices of the vehicle, such as, height control, shock absorber control, power steering control and skid control are controlled from the decision on the road condition.

22 Claims, 16 Drawing Figures

ROAD CONDITION DISCRIMINATING SYSTEM

BACKGROUND OF THE INVENTION

The present invention relates to a road condition discriminating system for discriminating the condition of the road on which a vehicle is running, in response to a vehicle speed signal generated by a vehicle speed sensor mounted on the vehicle.

In recent years, more and more electronic control devices have been incorporated into the chassis of automotive vehicles. A skid control device, a vehicle height control device, and a suspension control device are a few examples. In addition, such means as a power steering control device, a constant speed running control device and a transmission control device are being widely used.

The feature that these devices have in common is that a vehicle speed signal is used by some for the purpose of control. Thus, the use of a vehicle speed sensor is now becoming more common.

Where vehicle speed is detected by a wheel speed sensor mounted on a wheel, changes in wheel rotations are directly converted into signals.

Figure 1A:
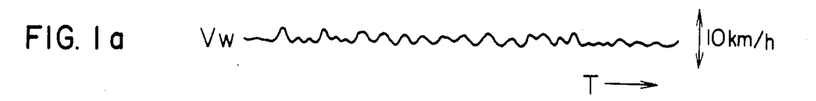
FIGS. 1a and 1b are diagrams showing waveforms of a vehicle speed signal produced when the car is running on a rough road.
Figure 1B:
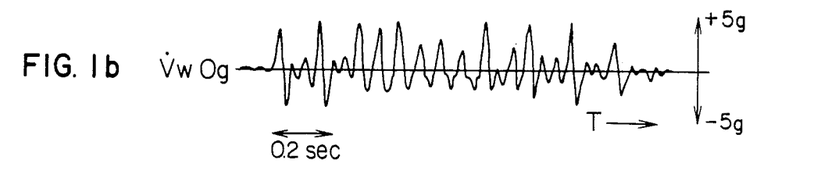

Experiments show that the wheel speed $V_W$ irregularly changes on a rough road as shown in FIG. 1a so that the differentiated value of the wheel speed $V_W$, that is, the wheel acceleration/deceleration $\dot{V}_W$ in FIG. 1b, is subjected to irregular fluctuations around 0g (g: Gravitational acceleration). It has been found that this irregularity has been mainly caused by the disturbances of the wheel speed signals due to the bouncing of the wheels and the vibrations of the chassis on a rough road surface.

Generally, some chassis control systems, if controlled the same way on rough roads as on good roads, do not operate as well as they might, or should better be differently adjusted for rough and good roads to attain higher stability, maneuverability or safety.

In skid control systems, for example, operation on a rough road often produces an erroneous wheel speed signal due to the irregular vibrations on the road surface so that a false brake cancel signal is sometimes generated, reducing controllability and lengthening the vehicle braking distance considerably over the correct braking distance under locked conditions. Correspondingly, a vehicle height control system, poses the problem of contact between the body chassis and the surface of a rough road. A suspension control system encounters the problem of a reduced riding quality and maneuverability on a rough road. Further, a rough road causes the power steering control system to operate with a lower maneuverability.

The systems or methods for discriminating the conditions of the road surface so far disclosed include a system in which the road surface is scanned by a photoelectric transducer and the reflected brightness is analyzed to determine the road surface conditions (Japanese Patent Laid-Open No. 77946/82) and a system in which a visible light or infrared light is radiated on the road surface and the reflected light is analyzed to discriminate the road surface conditions (Japanese Patent Laid-Open No. 5900/83). These systems are complicated in construction and high in cost, and therefore are not of high practical value for application to vehicles.

SUMMARY OF THE INVENTION

Accordingly, it is an object of the present invention to provide a road condition discriminating system and method in which a vehicle speed sensor which forms a part of the wheel system of the automobile produces a vehicle speed signal which is analyzed in a control system to discriminate the road surface conditions.

Another object of the present invention is to provide a road condition discriminating system and method in which, in response to the detection of rough conditions of the road surface, the control characteristics of a chassis control system or the like are changed automatically to meet the rough road conditions to compensate for reduced performance which otherwise might pose a problem for the vehicle running on a rough road.

A further object of the present invention is to provide a road condition discriminating system and method whereby the stability, maneuverability and safety of the automotive vehicle are improved regardless of the unevenness of the road surface.

A still further object of the present invention is to provide an economical and practicable road condition discriminating system and method suitable for chassis control, in which the need of a special sensor is eliminated by utilizing the vehicle speed sensor now being widely used on vehicles for discriminating the road conditions.

According to the present invention, there is provided a road condition discriminating system and method in which the characteristics of a chassis control system that have so far been fixed at an intermediate condition between good and rough roads or at a point nearer to the good road condition are controlled differently for good and rough road conditions. As a result, control characteristics meeting good road conditions are secured while the car is running on a good road, while control characteristics are changed to meet rough road conditions when the car enters a rough road, thus realizing a vehicle higher in stability, maneuverability and safety. Further, the signal produced from the conventional vehicle speed sensor now being widely used is utilized to discriminate the road surface conditions, thereby producing an economical, feasible road surface condition discriminating system. The term chassis control system includes any system for controlling the chassis of a vehicle or the like, including said control systems, height control systems, suspension control systems, power steering control systems, speed control systems, and transmission control systems and the like.

DESCRIPTION OF THE PREFERRED EMBODIMENTS

Figure 2:
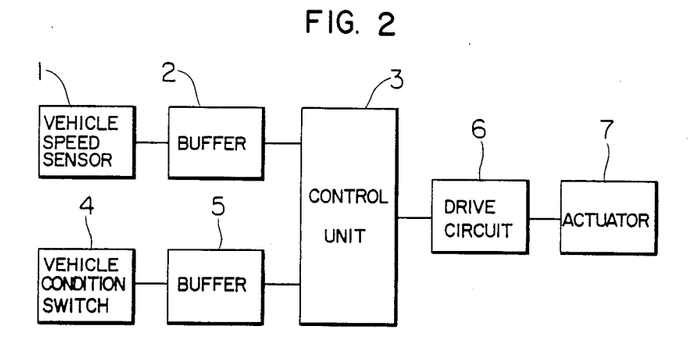
FIG. 2 shows a general configuration of an embodiment of the present invention.
Figure 2A:
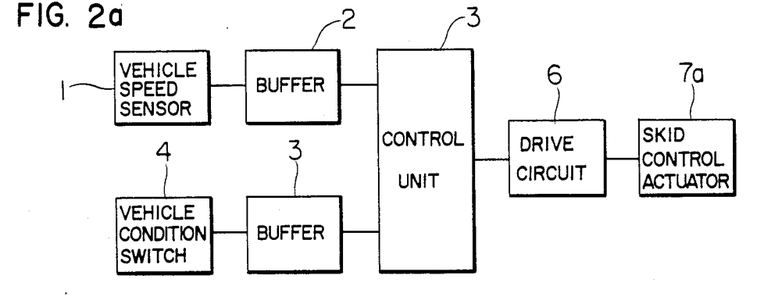
FIGS. 2a to 2d are diagrams showing detailed forms of an actuator included in FIG. 2.
Figure 2B:
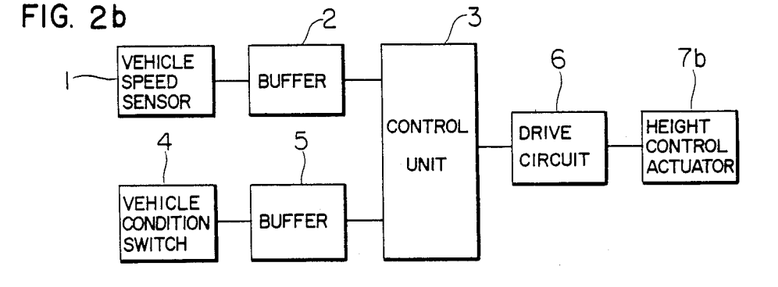
Figure 2C:
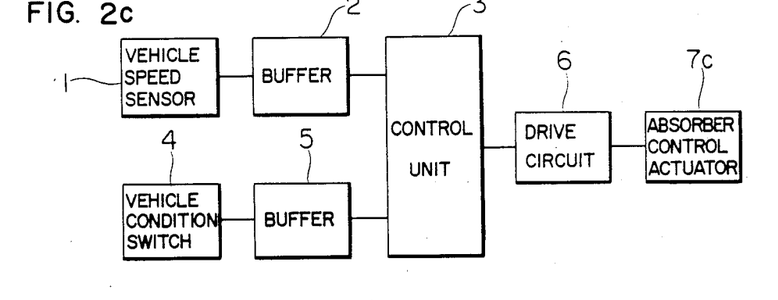
Figure 2D:
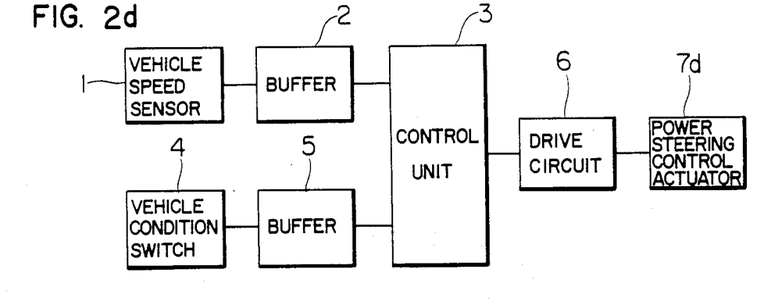

An embodiment of the present invention will be explained below with reference to the drawings. FIG. 2 is a block diagram showing an embodiment of the present invention. Reference numeral 1 designates a vehicle speed sensor mounted on the axle of a driven wheel for producing a speed signal of a frequency proportional to the rotational speed of the wheel. Numeral 2 designates an input buffer for the vehicle speed sensor, numeral 3 a control unit (microcomputer), numeral 4 a vehicle condition switch, numeral 5 an input buffer for the vehicle condition switch, numeral 6 an actuator drive circuit, and numeral 7 an actuator. The actuator 7 employed herein includes, as shown in FIGS. 2a to 2d, (a) a skid control actuator 7a for regulating the brake oil pressure at the time of braking the wheels to prevent the locking of the wheels, (b) a height control actuator 7b for adjusting the height of the vehicle, (c) an absorber control actuator 7c for adjusting the suspension characteristics of the vehicle, or (d) a power steering control actuator 7d for controlling the operating weight of the steering wheel, or a like actuator for what is generally called the chassis control system.

The control unit 3 is made up of a microcomputer, and the vehicle condition switch 4 is a brake switch (SW) the like.

Now, the function of an embodiment will be explained with reference to the drawings and flowcharts.

Figure 3:
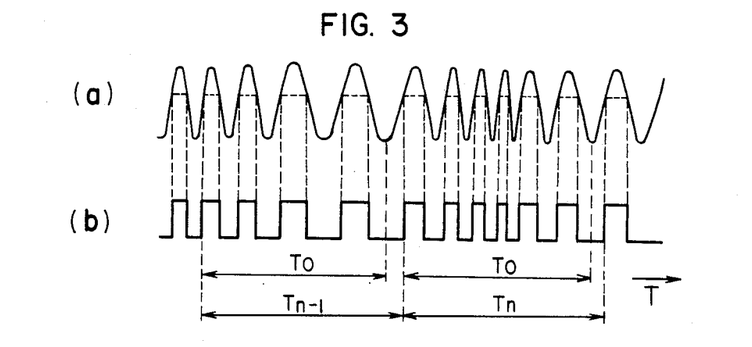
FIGS. 3(a) and 3(b) show waveforms for explaining the operation of the circuits in FIG. 2.

FIG. 3 shows a partially enlarged waveform of the vehicle speed signal produced from the car while running on a rough road represented by the waveform of FIG. 1b. When the car is running on a good road (such as an asphalt-paved road which is smooth and not uneven) at steady speed, the output waveform of the vehicle speed signal is normally produced in substantially regular cycles. When the car enters a rough road, however, the output waveform of the vehicle speed sensor is disturbed so that the cycles of the output may subjected to a variation of about 4 to 5 km/h in terms of vehicle speed. In such a condition, the wheel acceleration or deceleration differentiated from the wheel speed may change as much as about ±5 g (g: Gravitational acceleration).

Now, explanation will be made below of several methods of discriminating the rough road surface conditions from a performance criterion of the road surface conditions on the basis of feature parameters extracted on the variations of wheel speed taking irregular form of variations in the wheel acceleration and deceleration differentiated by the wheel speed.

The vehicle speed signal shown in FIG. 3(a) produced from a wheel speed sensor is shaped and converted into a vehicle speed pulse signal in the waveform of FIG. 3(b). In order to accurately determine the wheel speed and the wheel acceleration and deceleration from this vehicle speed signal, an average wheel speed $V_W$ is calculated from both the period $\Delta T$ between a certain reference vehicle speed pulse and another vehicle speed pulse immediately following the lapse of a predetermined time $T_0$, and also the number $N_P$ of vehicle speed pulses applied during the same period.

$$V_{Wn} = K_1 \times N_p / \Delta T \quad (K_1: \text{Constant}) \tag{1}$$

The wheel acceleration and deceleration is a differentiation by time of the wheel speed $V_W$, and therefore is given as $$\dot{V}_{wn} = \{(V_{wn} - V_{wn-1})/(\Delta T_n + \Delta T_{n-1})/2\} \tag{2}$$

(Suffix n: Present data; n−1: Preceding data).

Figure 4:
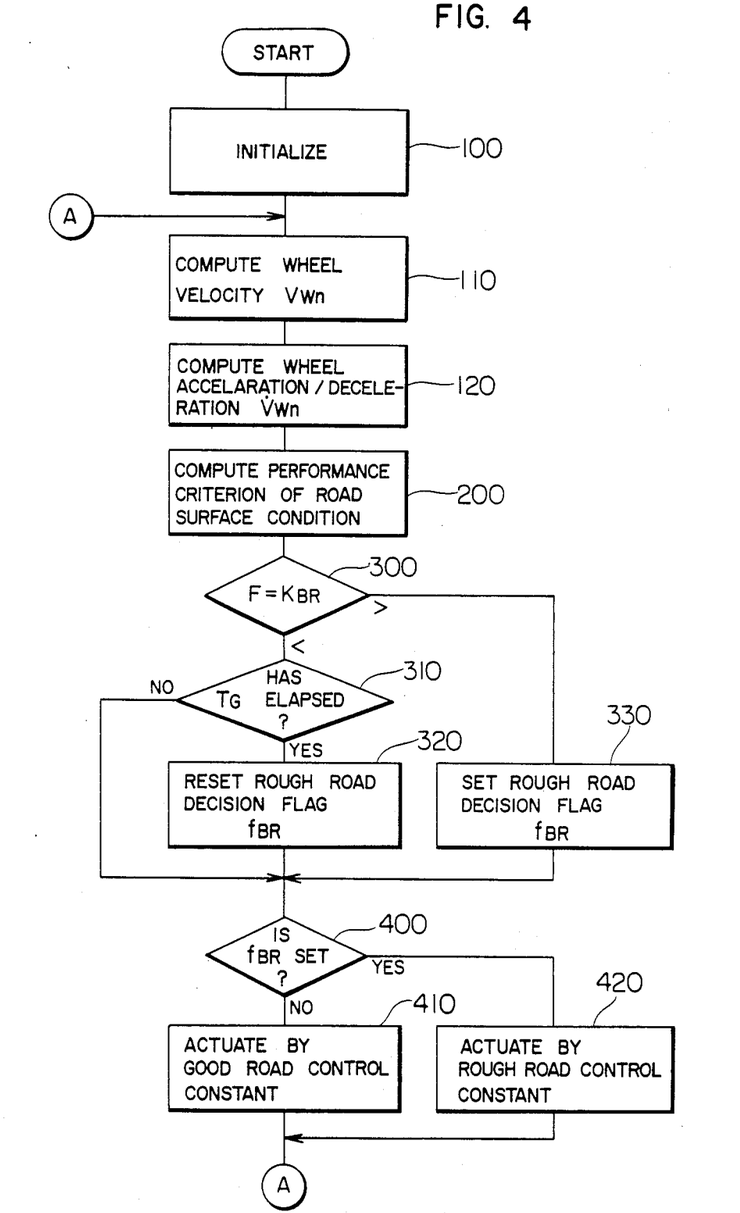
FIG. 4 is a flowchart showing the general operation of the system.

FIG. 4 is a flowchart showing a method of discriminating rough road conditions. First, with the start of the program, work registers and the like used for the following operations are initialized at step 100. Step 110 computes the wheel speed $V_{wn}$ by the wheel speed formula (1) described above. The next step 120 computes the wheel acceleration and deceleration $\dot{V}_{wn}$ by the above-mentioned wheel acceleration/deceleration formula (2) from the wheel speed $V_{wn}$ computed at step 110 and the wheel speed $V_{wn-1}$ in the preceding step.

At next step 200, as described more in detail in three embodiments later, the wheel acceleration/deceleration $\dot{V}_w$ obtained at step 120 is analyzed to compute the performance criterion F of the road conditions. This computation will be described more in detail with reference to embodiments later. After computing the performance criterion F of the road surface conditions at step 200, step 300 compares a predetermined rough road setting $K_{BR}$ with the performance criterion to determine whether the road surface is in good or bad condition. When the value of the performance criterion F is higher than the setting, a rough road surface condition is indicated.

Instead of a single rough road setting $K_{BR}$ used above, a plurality of settings representing different grades of road conditions may be used to determine the road surface conditions. Such may include good road, a rough road, a very rough road, and the like. Also, a control variable continuously changing with the performance criterion F may be computed.

The case in which two road settings, good and rough roads, will be explained below for convenience. If the performance criterion F is larger than the rough road setting level $K_{BR}$ at step 300, the process is branched to step 330 where a rough road decision flag $f_{BR}$ is immediately set. If the performance criterion F is determined to be smaller than $K_{BR}$ at step 300, on the other hand, the process proceeds to step 310 to decide whether the decision on good road condition ($F < K_{BR}$) has continued for a predetermined time $T_G$ longer than the time required for decision on a rough road condition.

The rough road decision flag $f_{BR}$ is not immediately reset to show a good road condition because it is generally necessary to determine a rough road condition as early as possible and to avoid a faulty decision. For this purpose, the decision time for good and rough road conditions should be set short and the decision level thereof at a somewhat high value. As a result, a rough road decision may not continue and the decision level may not be reached while the car is running on a rough road depending on the surface conditions thereof. In such a case, if good and rough road surface decisions would be alternated frequently to cause the actuator characteristics to follow the decision, an overcontrol would pose the problem of hunting or the like. For this reason, only after a rough road condition is not detected for a certain continuous period of time, and the decision of a good road condition is restored for this period of time, the rough road decision flag $f_{BR}$ is reset at step 320.

At next step 400, the present road condition is discriminated by the rough road condition decision flag $f_{BR}$, and if a good road condition decision is involved, the process is passed to step 410, where the actuator is controlled by the good road control constant matching the good road condition. If the present decision at step 400 is of a rough road condition, on the other hand, the process is jumped to step 420 to control the actuator by the rough road condition decision constant matching the rough road. The process is then returned to step 110 to repeat the above-mentioned operation. This control makes possible the control operation in accordance with good and rough road conditions.

Now, means of calculating several functions F for evaluating the road surface conditions described with reference to step 200 will be explained in more detail with reference to a waveform diagram and a flowchart.

Figure 5:
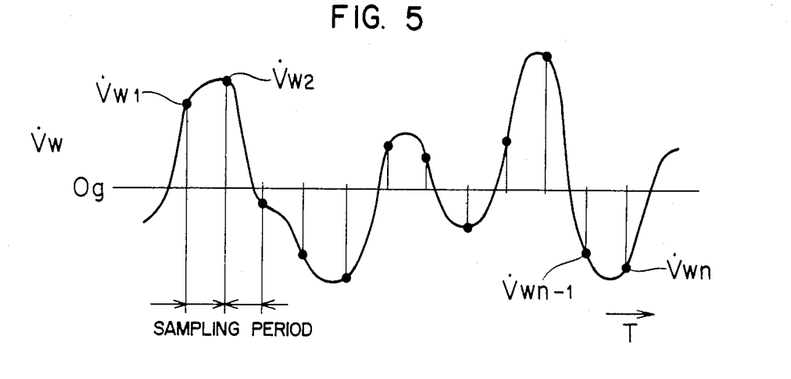
FIG. 5 shows a waveform for explaining the analysis of variance.
Figure 6:
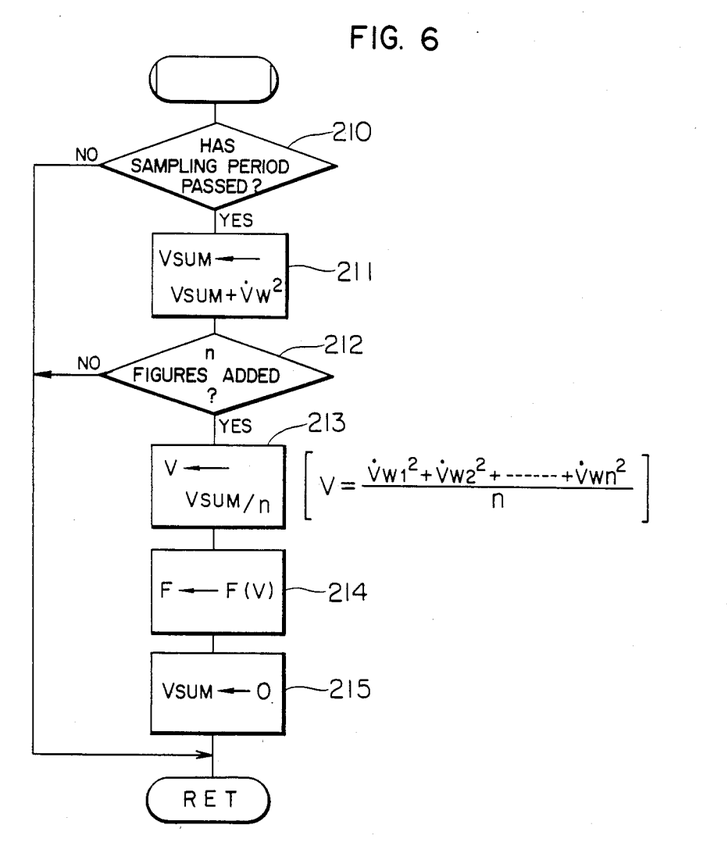
FIG. 6 is a flowchart showing the operation of the analysis of variance.

In first means, the variance of the wheel acceleration/deceleration is determined from FIGS. 5 and 6 to obtain a performance criterion of the road surface conditions in the manner described below. The variance represents a unit magnitude of an error, a variation or a change, and if a target of n measurements $X_1, X_2, \ldots, X_n$ is $X_0$, the variance V is defined as $$V = \{(X_1 - X_0)^2 + (X_2 - X_0)^2 + \ldots + (X_n - X_0)^2\}/n \quad (3)$$

The wheel acceleration or deceleration lacks a value corresponding to the target $X_0$, and in view of a predetermined speed assumed and the fact that the maximum and minimum acceleration or deceleration is at most $+0.8$ g to $-1.0$ g, the target $X_0$ may be taken as 0 in equation (3). In FIG. 5, assuming that the actual wheel acceleration or deceleration is given by n values of $\dot{V}_{w1}, \dot{V}_{w2}, \ldots \dot{V}_{wn}$, the variance V of the wheel acceleration or deceleration is expressed as $$V = (\dot{V}_{w1}^2 + \dot{V}_{w2}^2 + \ldots \dot{V}_{wn}^2)/n \quad (4)$$

The variance V of the wheel acceleration/deceleration obtained from this equation (4) represents the magnitude of variations in wheel revolutions, that is, a parameter indicating the road surface conditions. As is obvious, the higher the value V, the more rough road surface conditions are indicated. Now, the sampling period of this wheel acceleration/deceleration will be studied. Depending on the intervals of unevenness of the road surface (intervals of unevenness per unit distance) and the vehicle speed, the sampling period may effect the determination of road surface roughness. An experiment conducted on an actual vehicle shows that the maximum frequency of the actual variation period of the wheel, acceleration/deceleration is at most on the order of 10 Hz. This results from due to the air pressure of the tire and the vehicle suspension characteristics, and the resulting repetitive resonation of wheel bound and rebound on the roughness of the road surface. This frequency substantially coincides with the resonant frequency of vibration of unspring. From this, it was found that the sampling frequency of wheel acceleration/deceleration is at most about 30 Hz according to the sampling principle, and that it is possible to grasp the variations thereof. It will be thus seen that the variance of the wheel acceleration/deceleration is effective as a performance criterion. A flowchart of a subroutine for computing the variance of the wheel acceleration/deceleration as a performance criterion will be explained with reference to FIG. 6.

Step 210 determines whether or not the sampling period has elapsed. If the period has not elapsed, the process is returned to the main routine. This sampling period is 32 ms, for instance, as seen from the preceding study. Step 211 collects the wheel acceleration/deceleration value $\dot{V}_w$ for sampling and adds the squares thereof. $V_{SUM}$ indicates the addition work area where the square of $\dot{V}_w$ is added and stored each sampling period $$\left( V_{SUM} = \sum_{i=1}^{n} \dot{V}_{w1}^2 \right).$$

At step 212, it is decided whether or not the number sum of squares which has been added has reached n, and if the value n is not yet reached, the process is returned to step 210. If n is reached, on the other hand, step 213 divides $V_{SUM}$ to compute the variance V of the vehicle acceleration/deceleration. The performance criterion on the road surface condition with this variance as a parameter is defined as $F = F(V)$ in step 214. This is also a function to convert the variance data into a decision variable for rough road. Step 215 clears the variance computation work area $V_{SUM}$ to prepare for the variance computation in the next decision cycle.

The feature of this variance analysis lies in a large dynamic range of the performance criterion $F = F(V)$, making the decision of road surface conditions very high in accuracy. Nevertheless, it requires much processing time and work memory before decision.

Figure 7:
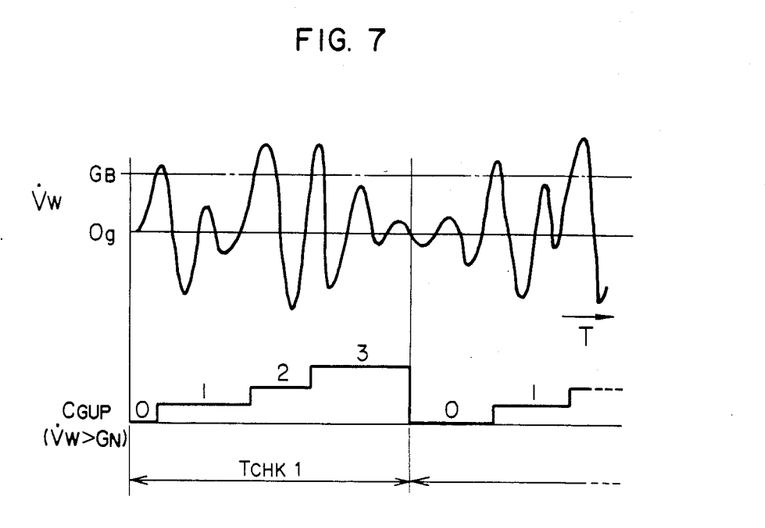
FIG. 7 is waveforms for explaining the analysis of a variable frequency.
Figure 8:
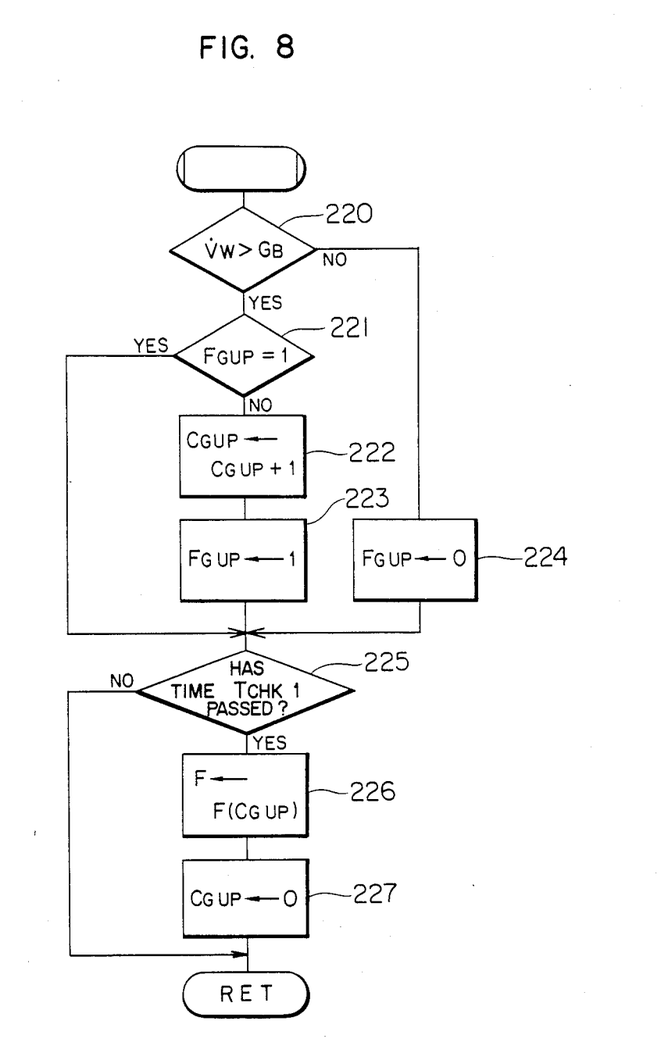
FIG. 8 is a flowchart showing the operation of the analysis of the variable frequency.

An example of second means for computing the performance criterion of the road surface conditions which is small in working area, comparatively short in processing time and is capable of computing the variation frequency representing the variations of the road surface and the car body will be explained below with reference to FIGS. 7 and 8.

The feature of this means lies in that a reference level of acceleration/deceleration for road surface decision ($G_B$) is provided to correspond to the wheel acceleration/deceleration. The number of times this reference level is exceeded by the wheel acceleration/deceleration is counted, and the resulting count is used as a performance criterion for evaluating the road conditions. FIG. 7 is a diagram showing the manner in which the number of times the reference level of acceleration/deceleration $G_B$ is exceeded by the wheel acceleration/deceleration $\dot{V}_w$ during a predetermined period of time $T_{CHK1}$ is determined by counting on the counter $C_{GUP}$. This processing will be explained below with reference to the flowchart of FIG. 8.

Step 220 compares the wheel acceleration/deceleration $\dot{V}_w$ with the reference level $G_B$, and if $\dot{V}_w$ is equal to or larger than $G_B$, the process is jumped to step 224 where the flag $f_{GUP}$ is set to zero. This decision flag $f_{GUP}$ is set to "1" when $\dot{V}_w$ exceeds $G_B$, and is held to "1" as long as $\dot{V}_w$ is larger than $G_B$. The flag is then reset to "0" when $V_w$ is reduced below $G_B$. The decision flag $f_{GUP}$ also has the function of enabling the counter $C_{GUP}$ to count the number of times the wheel acceleration/deceleration $\dot{V}_w$ exceeds the reference level $G_B$. As explained above, when it is decided at step 220 that $\dot{V}_w$ is larger than $G_B$, step 221 determines whether or not the flag $f_{GUP}$ is "1", and if it is already "1", the count of the counter $C_{GUP}$ is passed, while if the state of flag $f_{GUP}$ is "0", step 222 counts up the counter $C_{GUP}$ followed by step 223 for setting the flag $f_{GUP}$ to "1". The decision step 225 decides whether or not a predetermined time $T_{CHK1}$ has been passed, and if this time has not yet been passed, the process is returned to the main routine. If the predetermined time $T_{CHK1}$ is passed, on the other hand, step 226 establishes the definition $F=F(C_{GUP})$ as to the performance criterion F of the road surface conditions with the count $C_{GUP}$ referring to the number of times that $V_W$ exceeds the decision level $G_B$ during the time $T_{CHK1}$, as a parameter. This performance criterion F of the road surface condition has also a function to convert the number of variations for a certain time, that is, the vibration frequency of the road surface or vehicle into a decision variable for deciding a road condition. Step 227 clears the counter $C_{GUP}$ in preparation for the next decision cycle.

The feature of the above-mentioned second means of producing a performance criterion of the road surface conditions by counting the number of times the reference level of acceleration/deceleration is exceeded resides in the comparatively small number of work memories required and that since the variation frequency for a certain time can be determined, it is possible to determine the variation frequency of the road surface or vehicle. On the other hand, the disadvantage of this means is that unless the measuring time $T_{CHK1}$ is long, a sufficient reliability is not obtained of the performance criterion $F=F(C_{GUP})$ of the road surface conditions.

Figure 9:
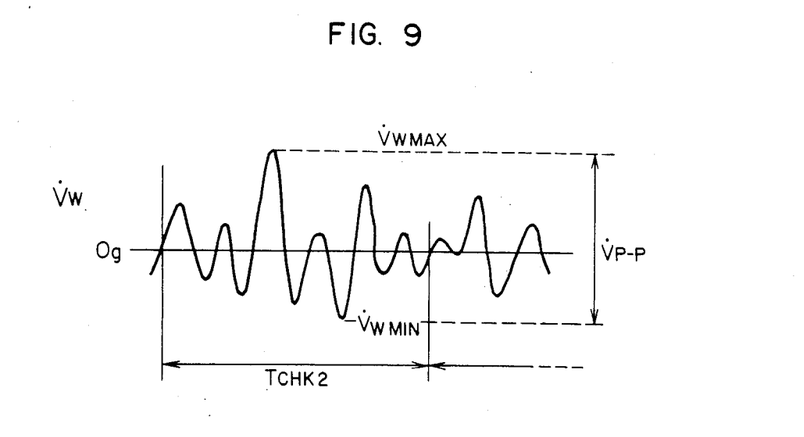
FIG. 9 shows a waveform for explaining the analysis of the variation amplitude thereof.

Third means is described herein for producing a performance criterion of the road surface conditions from the difference between maximum and minimum peak values. In this third means requiring only a short decision time and comparatively few work memories as compared with the preceding two embodiments, the magnitude of the variations in wheel acceleration/deceleration is determined from the difference between maximum and minimum peak values. An example of this third means will be explained with reference to FIGS. 9 and 10. The feature of this means lies in that the road conditions are evaluated on the basis of the amplitude width of variations of the wheel acceleration/deceleration. FIG. 9 shows that the maximum value $\dot{V}_{wmax}$ ($>0g$) of wheel acceleration and the minimum value $\dot{V}_{wmin}$ ($<0g$) of the wheel deceleration during a predetermined time $T_{CHK2}$ are determined, so that the difference therebetween $V_{P-P}=V_{wmax}-V_{wmin}$ is used as a performance criterion of the road conditions. This processing operation will be described below with reference to the flowchart of FIG. 10.

Figure 10:
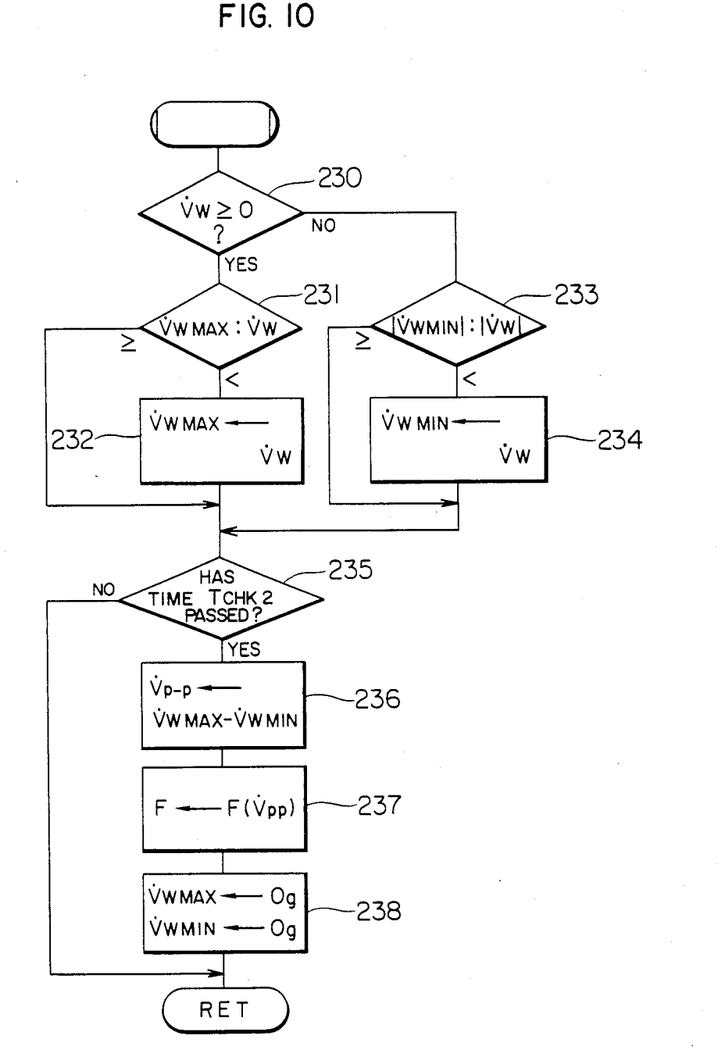
FIG. 10 is a flowchart showing the operation of the variation amplitude analysis.

Step 230 decides whether or not the value of wheel acceleration/deceleration $\dot{V}_w$ is positive or negative. If it is positive, step 231 compares the preceding maximum wheel acceleration $\dot{V}_{wmax}$ with the present wheel acceleration $\dot{V}_w$, and if $\dot{V}_{wmax}$ is equal to or larger than $V_w$, the step 232 is skipped. If it is determined that $\dot{V}_{wmax}$ is smaller than $\dot{V}_w$, on the other hand, step 232 sets $\dot{V}_w$ to $\dot{V}_{wmax}$. In similar fashion, if the value of $\dot{V}_w$ is negative, steps 233 and 234 compare the value of $\dot{V}_w$ with the preceding minimum value $\dot{V}_{wmin}$ (smaller than $0g$) so that the smaller value is set to $\dot{V}_{wmin}$. In this way, step 235 decides whether or not a predetermined time period $T_{CHK2}$ has passed, and if the period of time $T_{CHK2}$ has not yet passed, the process is returned to the main routine, while if the time $T_{CHK2}$ has passed, step 236 determines the difference $V_{P-P}$ between $V_{wmax}$ and $V_{wmin}$. At step 237, the performance criterion of the road surface condition F with $V_{P-P}$ as a parameter is defined as $F=F(V_{P-P})$. This is a function to convert the variation amplitude of the wheel acceleration/deceleration into a rough road decision variable. Step 238 sets both $V_{wmax}$ and $V_{wmin}$ to $0g$ to set the standard for the next decision cycle. The feature of the third means for determining the amplitude width of the variations in wheel acceleration/deceleration is that the time $T_{CHK2}$ before decision is short. The disadvantage, however, is that the system is easily affected by an incidental vibration or noises of the vehicle speed sensor.

The foregoing is the description of means of evaluating the road surface conditions by analysis, firstly, of the variation period of the wheel acceleration/deceleration, secondly, of the variation frequency thereof, and thirdly, of the variation amplitude thereof. The system according to the present invention, however, is not limited to those means, but may be a combination or application of any of these means. For example, evaluation may be made such means as based on an integrated amount of the absolute value of the wheel acceleration/deceleration or on the analysis of only the positive wheel acceleration which is a feature of the vibrations on the rough road surface. In other words, appropriate decision means may be selected taking the response characteristic or controllability of the control unit, the memory capacity of the decision means and the accuracy of the vehicle speed sensor into consideration.

In the above-mentioned embodiments, the decision means use the vehicle speed signal only from one wheel for analysis. Instead, a plurality of vehicle speed signals from a plurality of wheels may be used and analyzed for each wheel by the above-mentioned decision means, so that the average or maximum value of the performance criteria is used to decide the road surface conditions. In a system including both driving and driven wheels, it has been found that the driven wheel is smaller in weight of inertia and therefore is easily affected by the road surface vibrations, resulting in a larger dynamic range of the performance criterion of the road surface conditions and higher decision accuracy. It has been found also that if the resolution of the vehicle speed sensor is considerably high, the driving wheel is also affected by road surface vibrations so that the differentiated wheel speed clearly carries variations. On the basis of these facts, the control section of the chassis control unit having at least one vehicle speed sensor of the vehicle wheel system is provided with a road surface condition discriminator means using the vehicle speed signal. In this way, a road condition discriminator has been completed on the basis of vehicle tests, whereby the control characteristics can be automatically changed to those proper for a rough road when the vehicle runs on the rough road, thereby providing a superior control device which can improve the vehicle stability and safety.

In place of the microcomputer used for the control unit with the function thereof described with reference to the flowcharts in the above-mentioned embodiments, a logic circuit may be used to make a hardware circuit with equal effect.

In a system where separate controls are effected in response to a vehicle speed sensor, a device may determine the road surface conditions and apply a decision signal to other control devices so that all such control devices may not be required to decide the road surface conditions by themselves. In another modification, an exclusive road surface condition discriminator is provided to apply a signal and data to each control device.

What is claimed is:

1. A rough road discriminating system for a vehicle having a wheel system comprising:
    vehicle speed sensor means, adapted to be mounted on a part of said wheel system of said vehicle, for generating a vehicle speed signal in response to revolutions of a wheel thereof;
    processing means for performing the following functions: (a) computing a value of wheel acceleration/deceleration as a rate of change of wheel speed representing a differentiated value of wheel speed, based on said vehicle speed signal, (b) generating a change degree signal by computing an amount of change in a magnitude of said wheel acceleration/deceleration during a predetermined period of time, and (c) comparing said change degree signal with a set value and generating a rough road decision signal indicating that said vehicle is running on a rough road when said change degree signal exceeds said set value; and
    actuating means for controlling actuating means of said vehicle in accordance with the rough road decision signal from said processing means.

2. A system according to claim 1, wherein said processing means, in generating said change degree signal, computes a number of times said wheel acceleration exceeds a predetermined threshold value during said predetermined period of time.

3. A system according to claim 1, wherein said processing means, in generating said change degree signal:
    determines a maximum and a minimum value of said acceleration during said predetermined period of time; and
    computes a difference between said maximum value and a minimum value of said wheel acceleration during said predetermined period of time.

4. A system according to claim 1, wherein said processing means, in performing said comparing function, compares said change degree signal with at least two reference levels.

5. A system according to claim 4, wherein said processing means continues to output said decision signal indicating rough road after smooth road is detected for a predetermined time longer than said processing means continues to output no decision signal indicating smooth road after rough road is detected.

6. A system according to claim 1, wherein said actuating means includes a skid control actuator.

7. A system according to claim 1, wherein said actuating means includes a height control actuator.

8. A system according to claim 1, wherein said actuating means includes an absorber control actuator.

9. A system according to claim 1, wherein said actuating means includes a power steering control actuator.

10. A system according to claim 1, wherein said processing means, in generating said change degree signal also computes a variance value V with respect to n values of said wheel acceleration including $V_{w1}'$, $V_{w2}'$, ..., $V_{wn}'$ during a predetermined sampling period, said variance value V being obtained from an equation:

$$V=(V_{w1}'^2+V_{w2}'^2+\ldots V_{wN}'^2)/n$$

and wherein the variance value V is used as said change degree signal.

11. A rough road discriminating system for a wheeled vehicle, comprising:
    first means for detecting a speed of a wheel of said vehicle and producing a signal indicative thereof; and
    second means for performing the following:
    (1) calculating a rate of change of said detected wheel speed;
    (2) determining a change amount in said rate of change over a first predetermined time;
    (3) determining whether said change amount is greater than a predetermined rough road setting;
    (4) indicating a rough road if said amount is greater than said rough road setting; and
    (5) indicating a non-rough road only after said amount has been less than said rough road setting for time greater than a second predetermined time.

12. A system as in claim 11 wherein said second means in performing said determining function (3):
    (3a) computes a variance of wheel speed rate of change as a sum of squares of different wheel speed rates of change divided by a number of factors making up the sum,
    (3b) looks up a road surface coefficient in a table as a function of said computed variance, and
    (3c) determines whether said looked up road surface coefficient is greater than a predetermined rough road setting.

13. A system as in claim 11 wherein said second means in performing said determining function (3):
    (3a) determines whether said rate of change is positive or negative,
    (3b) determines if a current positive rate of change is greater than a previous maximum rate of change, and increases said previous maximum to said current value when it is greater,
    (3c) determines if a current negative rate of change is less than a previous minimum rate of change, and decreases said previous minimum to said current value when it is less,
    (3d) repeats said functions (3a)–(3c) for a predetermined time interval,
    (3e) determines a difference between said maximum and minimum values,
    (3f) looks up a road surface coefficient in a table as a function of said difference, and
    (3g) uses said road surface coefficient as said change amount.

14. A system as in claim 11 wherein said second means in performing said determining function (3):
    (3a) determines when said rate of change value exceeds a predetermined threshold,
    (3b) counts the number of occurrences of said threshold being exceeded in a predetermined time,
    (3c) looks up a road surface coefficient in a table as a function of said counted occurrences per predetermined time, and
    (3d) uses said road surface coefficient as said change amount.

15. A device for calculating a roughness of a road being traversed by a wheeled vehicle, comprising:
    first means for detecting a speed of a wheel of the vehicle; and
    second means for:
    (1) calculating a rate of change of said wheel speed,
    (2) computing a variance of said rate of change as a sum of squares of different wheel rates of change, divided by a number of factors making up the sum, and (b 3) looking up a road surface coefficient in a table as a function of said computed variance.

16. A device for calculating a roughness of a road being traversed by a wheeled vehicle, comprising:
first means for detecting a speed of a wheel of the vehicle; and
second means for:
(1) calculating a value of rate of change of said wheel speed,
(2) determining when said rate of change value exceeds a predetermined threshold,
(3) counting occurrences of said threshold being exceeded in a predetermined time, and
(4) looking up a road surface coefficient in a table as a function of said counted occurrences per predetermined time.

17. A device for calculating a roughness of a road being traversed by a wheeled vehicle, comprising:
first means for detecting a speed of a wheel of the vehicle; and
second means for:
(1) calculating a rate of change of said wheel speed,
(2) determining whether said rate of change is one of positive and negative;
(3) determining if a current positive rate of change value is greater than a previous maximum rate of change, and increasing said previous maximum to said current value when said current value is greater;
(4) determining if a current negative rate of change value is less than a previous minimum rate of change, and decreasing said previous minimum to said current value when said current value is less;
(5) repeating said functions (1)-(4) for a predetermined time interval;
(6) determining a difference between said maximum and minimum; and
(7) looking up a road surface coefficient in a table as a function of said difference.

18. A method of discriminating a rough road being traversed by a vehicle, comprising the steps of:
generating a vehicle speed signal in response to revolutions of a wheel;
computing a rate of change of wheel speed as a value of wheel acceleration representing a differentiated value of wheel speed based on said vehicle speed signal;
generating a change degree signal by computing a degree of change in a magnitude of said wheel acceleration during a predetermined period of time;
comparing said change degree signal with a set value;
generating a rough road decision result indicating that road running of said vehicle is running on a rough road when said change degree signal exceeds said set value; and
controlling an aspect of said vehicle in accordance with the rough road decision result.

19. A method as in claim 18 wherein said generating a rough road decision step includes:
indicating a rough road if said change degree signal is greater than said set value; and
indicating a non-rough road only after said change degree signal has been less than said rough road setting for a time greater than a second predetermined time.

20. A method as in claim 19 wherein said generating a change degree signal step includes:
computing a variance of said rate of change as a sum of squares of different wheel rates of change, divided by a number of factors making up such sum, and
looking up a road surface coefficient in a table as a function of said computed variance.

21. A method as in claim 19 wherein said generating a change degree signal step includes:
determining when said rate of change value exceeds a predetermined threshold,
counting occurrences of said threshold being exceeded in a predetermined time, and
looking up a road surface coefficient in a table as a function of said counted occurrences per predetermined time.

22. A method as in claim 19 wherein said generating a change degree signal step includes:
(a) determining whether said rate of change is one of positive and negative;
(b) determining if a current positive rate of change value is greater than a previous maximum rate of change, and increasing said previous maximum to said current value when said current value is greater;
(c) determining if a current negative rate of change value is less than a previous minimum rate of change, and decreasing said previous minimum to said current value when said current value is less;
(d) repeating said steps (a)-(c) for a predetermined time interval;
(e) determining a difference between said maximum and minimum; and
(f) looking up a road surface coefficient in a table as a function of said difference.

* * * * *